May 25, 1943.  H. R. PATTERSON  2,320,295
TAKE-UP MECHANISM
Filed Aug. 5, 1941  2 Sheets-Sheet 1
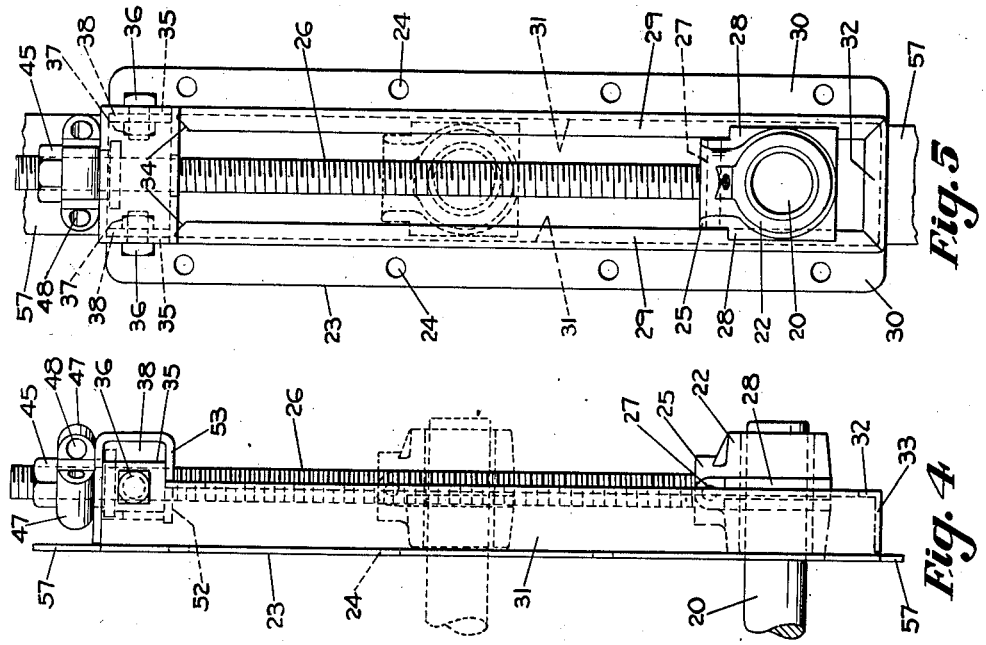
INVENTOR:
HARRY R. PATTERSON,
By Chas. M. Nissen
ATT'Y.

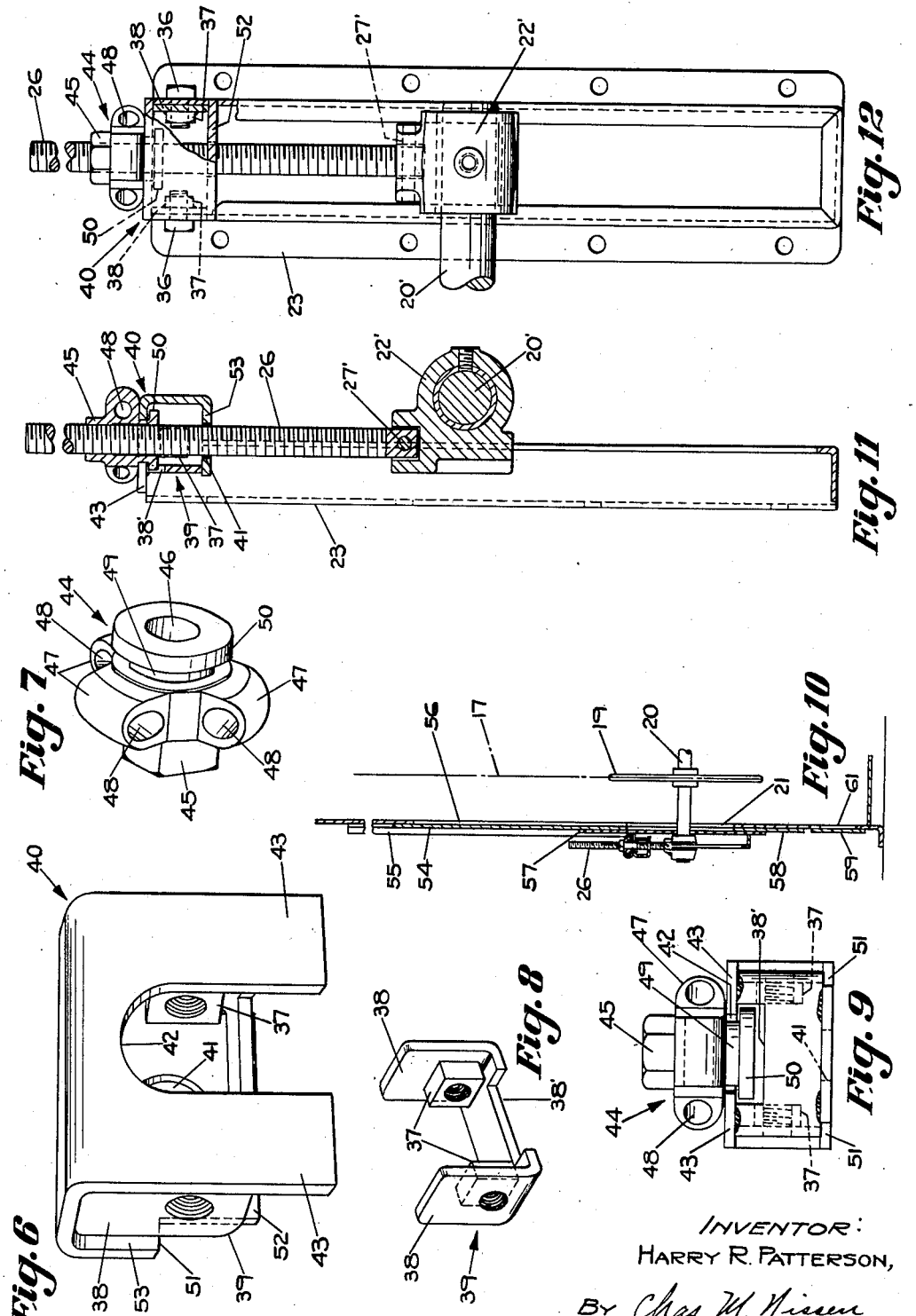

Patented May 25, 1943

2,320,295

UNITED STATES PATENT OFFICE 2,320,295

TAKE-UP MECHANISM

Harry R. Patterson, Columbus, Ohio, assignor to The Jeffrey Manufacturing Company, a corporation of Ohio Application August 5, 1941, Serial No. 405,524

13 Claims. (Cl. 308—59)

My invention relates to take-up mechanism for sliding bearings and although it is particularly adapted for use in connection with sliding bearings associated with a boot of a bucket elevator, it may have a general application.

One of the objects of the invention is the provision of improved and efficient take-up mechanism for sliding bearings, so mounted as to be readily detachable to enable a lifting force to be applied to a take-up screw to elevate the latter together with the sliding bearings.

Another object of the invention is the provision of detachable take-up mechanism for a take-up screw which is pivotally connected to a sliding bearing, to reduce to a minimum the consumption of time in making adjustments.

A further object of the invention is the provision of improved and efficient mechanism for closing openings in the walls of an elevator boot where exterior sliding bearings are connected to take-up mechanism.

Other objects of the invention will appear hereinafter, the novel features and combinations being set forth in the appended claims.

In the accompanying drawings,

Fig. 1 is a diagrammatic view in elevation of an elevator to which my improvements are particularly adapted;

Fig. 2 is a sectional plan view taken on the line 2—2 of Fig. 1;

Fig. 3 is an enlarged elevational view of the lower portion of the structure shown in Fig. 1;

Fig. 4 is an enlarged side elevational view of the take-up mechanism for the sliding bearing at one side of the elevator;

Fig. 5 is a front elevational view of the structure shown in Fig. 4;

Fig. 6 is a perspective view of the retaining device shown at the upper ends of Figs. 4 and 5;

Fig. 7 is a perspective view of the take-up nut;

Fig. 8 is a perspective view of the interior part of the retaining device shown in Fig. 6;

Fig. 9 is an elevational view of the take-up nut in association with the retaining device;

Fig. 10 is a sectional elevation taken on the line 10—10 of Fig. 3, looking in the direction of the arrows;

Fig. 11 is a sectional elevational view showing my improved take-up mechanism for a sliding bearing arranged at right angles relatively to that shown in Fig. 4; and Fig. 12 is a front elevational view similar to Fig. 5 but with the sliding bearing with its shaft at right angles relatively to that illustrated in Fig. 5.

Referring to Figs. 1 and 3, it will be seen that the elevator 13 comprises a vertical enclosed casing having a boot 14 at its lower end with an intake opening at 15. The discharge chute is illustrated at 16 in Fig. 1. A pair of endless draft elements 17 is connected to driving mechanism 18 at the top of the casing 13, such draft elements 17 being connected at their lower loops to spaced-apart wheels 19 which are fixed to the cross-shaft 20, the ends of which extend through the vertical slots 21 in the side walls of the elevator boot 14.

The outer ends of the shaft 20 are journaled in the bearings 22 which are slidable along the guide frame 23. These guide frames are secured at 24, 24 to the outer walls of the boot 14 so as to be rigidly connected to such walls and always occupying a stationary position. It should be understood that there are two guide frames 23 one on one outer wall of the boot 14 and the other on the outer surface of the opposite wall, there being two journal bearings 22 one for one end of the shaft 20 and the other for the other end thereof.

At the upper side of the journal bearing 22 is a cylindrical extension 25, the upper side of which has a cylindrical recess for receiving the lower end of the take-up screw 26 which is pivoted at 27 to the cylindrical extension 25. The diameter of the cylindrical recess in the upper side of the cylindrical extension 25 is larged than that of the take-up screw 26. The lower end of the screw 26 may be pivoted to the cylindrical extension 25 by means of a pin secured to the cylindrical extension 25 at both ends and passing loosely through a transverse opening in the lower end of the screw 26. By means of this construction the upper end of the screw 26 may be swung on its pivot 27 away from the upper portion of the guide frame 23 a limited distance for a purpose more fully explained hereinafter.

The lateral central portion of the journal bearing 22 is provided with vertical guide grooves 28 for receiving the spaced-apart vertical guides 29, 29 of the guide frame 23.

The guide frame 23 is preferably formed from a single strip of flat sheet metal so cut and bent into the form shown in Figs. 4 and 5 as to provide the flanges 30, 30 in the same plane, the vertical spaced-apart parallel walls 31, 31, and the spaced-apart guides 29, 29 in the same plane. The lower ends of the guides 29, 29 may be connected by the cross-plate 32 but inasmuch as the metal between the lower ends of the flanges 30, 30 has been cut away, only the lower transverse wall 33 and the cross-piece 32 connect the spaced-apart walls 31, 31. The cross-piece 32 serves to limit the movement of the journal bearing 22 in a downward direction.

The upper ends of the guides 29, 29 are cut away at 34, 34 so that extensions 35, 35 may each be provided with a perforation for receiving the shank of one of the bolts 36, 36. The bolts 36, 36 are adapted to be threaded into the nuts 37, 37 which are welded to the inner walls of the spaced-apart parallel plates 38, 38 of the U-shaped element 39 shown in perspective in Fig. 8. As shown in Fig. 6, the U-shaped element 39 fits into another but larger U-shaped element 40 and is secured thereto preferably by welding.

It will thus be seen that the unit shown in perspective in Fig. 6 constitutes a detachable retaining device. The extensions 35 are in the planes of the walls 31. When this retaining device is secured to the guide frame 23 by means of the bolts 36, 36, the upper horizontal legs 43, 43 engage the upper edges of the extensions 35, 35 while the lower legs at 53 engage the lower edges of the extensions 35, 35. These upper and lower edges of the extensions 35, 35 therefore serve as abutments to resist movement of the retaining device either up or down when held in place by the bolts 36, 36.

The U-shaped element 40 has a bottom opening 41 appreciably larger in diameter than the diameter of the feed screw 26 so as to freely pass over the latter during assembly or to permit the feed screw 26 to pass freely through the opening 41. The upper side of the element 40 is provided with a U-shaped slot 42 thus forming the legs 43, 43.

The take-up nut 44 shown in perspective in Fig. 7 is integral throughout and comprises a nut proper 45 the inner wall of which is screw-threaded so as to fit the screw threads of the take-up screw 26. Inasmuch as the take-up nut 44 is integral throughout, the cylindrical opening therethrough may be screw-threaded throughout its length and then counterbored at 46 approximately to the location of the rotating devices 47, 47 so that the counterbored portion 46 may slide freely over the upper end of the take-up screw 26 before the nut proper 45 is screw-threaded on to the take-up screw 26. The extensions 47 have tangential openings 48, 48 therethrough for receiving turning tools when desired.

The take-up nut 44 is provided with an annular groove 49 between the circular flange or collar 50 and the turning devices 47. The depth of the annular groove 49 and the diameter of the circular flange or collar 50 are such that the latter may be freely moved along the open ended slot 42 to a position where the opening 46 will be in alinement with the opening 41 shown in Fig. 6. The cut-out 38' affords ample space for movement of the collar 50 into its position shown in Fig. 9.

It should be particularly noted that the take-up mechanism shown in Figs. 3, 4 and 5 comprises four units, one being the integral guide frame 23, the second being the journal bearing 22 with the take-up screw 26 pivotally secured thereto, the third being the retaining device or cross-piece shown in Fig. 6, the fourth being the take-up nut 44 shown in Fig. 7. Fig. 9 shows the assembly of the units shown in Figs. 6 and 7.

Irrespective of the position of the journal bearing relative to the guide frame 23, even when the journal bearing is at its lowermost limit, the assembly of the retaining device and take-up nut 44 shown in Fig. 9 may be connected to the feed screw 26 by swinging the upper end of the latter outwardly away from the guide frame 23 to the distance permitted by the pivot 27 and the lower end of the screw 26 extending into the enlarged opening of the cylindrical extension 25. When the assembly shown in Fig. 9 is connected to the upper end of the take-up screw 26, the screw will pass freely through the opening 46 and then be engaged by the threads of the nut 45. At such time the cut-away portions 51, 51 will permit the bottom portion of plate 52 (as viewed in Fig. 6) to pass between the vertical parallel walls 31 and adjacent extension plates 35, 35. The openings in the extension plates 35 may be brought opposite the openings in the nuts 37, whereupon the parts will have been moved into the relative positions shown at the upper end of Fig. 4 with the lower edges of extension plates 35 above the lower plate 52 along the surface indicated by the reference number 53 in Fig. 6. The plates 38, 38 are located inwardly relative to the edges of the U-shaped element 40 and therefore the extension plates 35 are movable into a position to fit against the outer surfaces of the plates 38, 38 thus forming an interlocking connection between the extension plates 35 and the upper and lower plates of the element 40. In other words, plates 38, 38 cooperate with extensions 35 to prevent movement of the retaining device 39, 40 in either lateral direction along lines parallel with the plane of that through guides 29, 29 and at right angles to the axis of screw 26, and the spaced parts or plates 52 and 43, 43 of U-shaped element 40 cooperate with opposite edges of extensions 35, 35 to prevent movement of retaining device 39, 40 in either direction along the axis of take-up screw 26. When such interlocking relation has been effected by bringing the openings in the extension plates 35 into registry with the openings in the nuts 37, 37, the bolts 36, 36 may be screwed into place and tightened to hold the retaining unit shown in Fig. 6 rigidly connected to the upper end of the guide frame 23 with the take-up nut 44 on top of the retaining device but interlocked therewith by reason of the circular flange connection to the slot 42 as shown in Fig. 9. It is to be noted that no tension is put on bolts 36, 36 by screw 26 as the only direction in which retaining device 39, 40 can be moved even when said bolts 36, 36 are removed is along lines perpendicular to the plane of the guides 29, 29. Thus the forces on screw 26 are taken by interlocking parts of frame 23 (extensions 35, 35) and of retaining device 39, 40 (plates 43 and 52). For instance, when the spaced apart wheels 19 are to be lifted from their dotted line positions shown in Fig. 3 to their dot and dash line positions, the tension in the draft elements 17 will be relieved and the parts connected to the lower ends of the take-up screws 26 will be suspended by the latter. This weight suspended from the take-up screws 26 will exert tensions in the latter and will be resisted by the legs 43, 43 engaging the upper edges of the extensions 35, 35. On the other hand, if the spaced apart wheels 19 are moved down to put tension in the draft elements 17, the take-up screw 26 will be put under compression which will be resisted by the plate 52 engaging the lower edges of the extensions 35, 35.

The interlocking relation between the nut unit 44 and the retaining unit (Fig. 6) must be established before the nut 45 is screwed on to the take-up screw 26. It is also evident that when the bolts 36, 36 are removed, the nut unit 44 can not be removed from the retaining device (Fig. 6) until the nut 45 has been unscrewed from the take-up element 26. However, when the bolts 36, 36 are released, the nut element 44 and the retaining device while still associated with the take-up screw 26 may be detached from the take-up screw guide frame 23 by pivoting the take-up screw 26 on the pivot 27. In other words, when the bolts 36, 36 are removed, the nut element 44 together with the retaining device may be swung away from the guide frame on the pivot 27 and then the journal bearing 22 may be lifted or lowered manually by grasping the retaining device. In this manner the journal bearings on the opposite sides of the boot 14 may be moved manually in a minimum space of time so as to lift the wheels 19 and allow sufficient slack in the flexible draft elements 17 to enable lengthening or shortening of the same by the introduction of an extra link or the removal of a link therefrom. Or, if desired, one of the wheels 19 may be replaced if advisable or necessary. After the parts have been reassembled, the nut element 44 may be turned by inserting a turning tool in the openings 48 shown in Fig. 7 so as to force the wheels 19 down to their lower or dotted line positions where they will produce the desired tautness in the flexible draft elements 17.

On one side of the lower end of the casing 13 just above the boot 14 a sliding door 54 may be mounted to move along the vertical spaced-apart guideways 55, 55, as shown in Fig. 3. This inspection door when in its lower position closes the inspection opening 56.

The slots 21 in the opposite sides of the boot provide space for the up and down movements of the outer end portions of the shaft 20. In order to keep the slot 21 closed, a vertical rectangular sliding plate 57 is provided to serve as a dust door. The plate 57 has a perforation through which the shaft 20 extends and slides up and down when the shaft 20 is moved up or down, the plate 57 being located between the inner walls of the parallel spaced-apart side plates 31, 31 of the guide frame 23. To enable the back of the dust door 57 to fit against the front of the door 54, a filler plate 58 may be provided of a thickness equal to that of the inspection door 54 and mounted on the outer surface of the adjacent side wall of the boot 14. In other words, by providing the filler plate 58 and securing the same to the boot, it may serve to support the guide frame 23 so that the back of the plate 57 will slide along the front surface of the inspection door 54 and at the same time maintain closed the slot 21 and the slot in the plate 58 which registers with the slot 21.

In addition to the inspection door 54 and the slide plate 57, a door 59 may be secured to the boot 14 in the position shown in Fig. 3 by means of clamping devices 60, 60. The door 59 is for the purpose of normally closing the clean-out opening 61 shown in Fig. 10.

In Figs. 4 and 5 the shaft 20 and the journal bearing 22 are located at right angles to the front face of the guide frame 23, whereas in Figs. 11 and 12 the shaft 20' and the journal bearing 22' are arranged parallel to the front face of the guide frame 23, the take-up mechanism in Figs. 11 and 12 being the same as the take-up mechanism shown in Figs. 4 and 5. The pivot 27 in Figs. 4 and 5 is on an axis extending transversely of the shaft 20, but in Figs. 11 and 12 the axis of the pivot 27' is parallel to the axis of the shaft 20'. However, the axis of the pivot 27 and the axis of the pivot 27' are both parallel to the front face of the guide frame 23.

While I have indicated in dotted lines in Figs. 4 and 5 an intermediate position of the shaft 20 and the journal bearing 22, it should be understood that the nut 45 may be operated to adjust the journal bearing 22 from its lowermost position in contact with the cross-piece 32 to its uppermost position where the upper cylindrical extension 25 abuts against the lower side of the plate 52. When the bolts 36, 36 are removed and the retaining device together with the take-up nut unit 44 are swung away from the guide frame 23 on the pivot 27 or the pivot 27', the shaft 20 may be lifted manually a distance which is limited only by the upper ends of the slots 21. If desired, however, the upper ends of the slots 21 may be entirely open so that when the inspection door 54 is wide open the journal bearings together with the shafts 20 may be lifted entirely out of the boot 14 for bodily removal of the wheels 19. This is particularly true if inspection doors 54 are provided on both the front side and the rear side of the casing 13 as viewed in Fig. 3.

It should be particularly noted that the cross-piece 32 closes the lower end of the guide frame 23 and consequently the journal bearing 22 can never be taken out from the lower end of this frame. Therefore, the chains of the elevating apparatus need never be taken apart because provision is made by means of my improvements, for the journal bearings to be lifted bodily to a sufficient extent to afford so much slack in the elevating chains, that the lowermost sprockets together with the shaft 20 may be removed without taking apart any chains thereby saving considerable amount of time when the sprockets or the shaft are to be removed and replaced.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In take-up mechanism of the class described, the combination with a frame having spaced-apart parallel guideways and open at one end, of a journal bearing slidable along said guideways, a take-up screw pivoted to said journal bearing for limited angular movement relatively thereto, a retaining device connected to said frame and provided with an opening for receiving said take-up screw, a take-up nut journaled to said retaining device and threaded on said take-up screw to effect travel of the screw and the journal bearing upon rotation of the nut, and means for detachably connecting said retaining device to said frame, said retaining device when detached from said frame being movable bodily with said take-up screw on the latter's pivot to enable a lifting force applied to said screw to elevate the latter and said journal bearing without turning said nut.

2. In take-up mechanism of the class described, the combination with a frame having spaced-apart parallel guideways, of a shaft bearing slidable along said guideways, a take-up screw connected to said shaft bearing and held against rotation relative thereto, a retaining device having an opening through which said take-up screw loosely extends and adapted to retain said shaft bearing on said guideways, a take-up nut journaled to said retaining device for free rotary movement while being held thereby against axial movement and threaded on said take-up screw, and means free of longitudinal tension for detachably connecting said retaining device to said frame, said retaining device when removed providing for removal of said shaft bearing from said guideways.

3. In take-up mechanism of the class described, the combination with a frame having guideways, of a journal bearing slidable along said guideways, a cross-piece detachably connected to the open ended portion of said frame, a closure for the other end of the frame in position to prevent removal of the journal bearing from such other end, a take-up screw pivoted to said journal bearing and extending through said cross-piece, a take-up nut threaded on said take-up screw, and means for journaling said take-up nut to said cross-piece, the construction and arrangement being such that when said cross-piece is detached from said frame the take-up nut together with said take-up screw may be swung on the pivot between the take-up screw and said journal bearing and the latter lifted by said take-up screw without turning said nut, the construction and arrangement being such that the journal bearing can be removed from said frame only by detaching said cross-piece.

4. Take-up mechanism of the class described comprising the combination with a U-shaped frame permanently closed at one end and open at the other end, of spaced-apart parallel guides on said frame, a journal bearing having spaced-apart parallel grooves for receiving said guides, said journal bearing being insertable into the open end of said frame to fit said grooves over said guides, a cross-piece for the open end of said frame, means for detachably connecting said cross-piece to said frame, a take-up screw pivoted to said journal bearing on an axis extending transversely of said guides, a nut element threaded onto said take-up screw and journaled to said cross-piece, and interlocking mechanism between said cross-piece and said frame to prevent movement of said take-up screw axially relative to said cross-piece except as controlled by said nut element when said take-up mechanism is in assembled relation.

5. Take-up mechanism of the class described comprising the combination with a frame closed at one end and open at the other end, of a journal bearing, parallel spaced-apart guiding connections between said journal bearing and said frame, a take-up screw connected to said journal bearing and extending along said frame out from the open end thereof, a cross-piece at the open end of said frame, mechanism for detachably securing said cross-piece to said frame, and a one-piece nut element having means coacting with said cross-piece to form an interlocking connection between the nut element and said cross-piece.

6. As an article of manufacture, two interfitting U-shaped plates secured together with one provided with spaced-apart openings for the passage of a take-up screw and the other having threaded openings for receiving mounting screws.

7. As an article of manufacture, a rigid anchorage comprising interfitting U-shaped plates welded together, one plate having alined openings for passage therethrough of a take-up screw and the other plate having spaced-apart openings registering with nuts welded to the inner walls of the last-named plate.

8. The method of assembly for elevator take-up mechanism, which comprises providing an open ended frame with parallel spaced-apart flanges to serve as guides, slotting such flanges near the open end of said frame and bending the flanges at such open end of the frame into parallel spaced-apart planes at right angles to the guide flanges, providing a journal bearing with lateral spaced-apart grooves, connecting a take-up screw to said journal bearing, sliding said journal bearing into the open end of said frame and along said guide flanges, providing a box-like structure by interfitting and securing together into a rigid until two U-shaped plates one having an aperture spaced from an open ended slot for receiving said take-up screw and the other having openings for receiving mounting screws, providing a one piece nut having an annular groove, fitting said annular groove into said slot to interlock the nut with said box-like structure, moving the box-like structure along said take-up screw by turning said nut until the slotted U-shaped plate engages the ends of the aforesaid end flanges and finally passing the mounting screws through openings in said end flanges into the openings of one of said U-shaped plates to bolt the box-like structure rigidly to said frame.

9. Take-up mechanism of the class described, comprising the combination with a guide frame having parallel spaced-apart abutments at the open end thereof, of a U-shaped retaining plate with its legs adapted to engage opposite sides of said abutments and cooperating therewith to be held against movement along an axis, means for detachably securing said U-shaped plate to said frame and in abutting relation with said abutments, a member guided along said frame, a take-up screw connected to said member and extending through said U-shaped plate along said one axis, and a nut threaded on said take-up screw and associated with said U-shaped plate.

10. As an article of manufacture, a U-shaped plate having an opening extending through one portion and another portion having an open-ended slot, said plate being adapted to serve as a part of retaining structure for a take-up screw while extending through said opening and through said slot.

11. The combination with an enclosure, of a shaft in said enclosure and extending through one side thereof, a door for an opening in said enclosure, a filler plate secured to one side of said enclosure in vertical alinement with said door, take-up mechanism for said shaft and mounted on said filler plate, and a sliding door connected to said shaft to move up and down therewith to maintain closed a slot provided in said side of said enclosure for up and down movement of said shaft.

12. Take-up mechanism including a frame having spaced parallel guides lying in a common plane, a shaft bearing having spaced grooves adapted to receive said frame guides whereby said bearing may slide along said guides, a take-up screw connected to said bearing and extending between said guides, a retaining device extending across said guides adjacent one end of said frame having an opening through which said take-up screw extends, means cooperating with said take-up screw and retaining device to adjust said bearing along said guides and hold it in any selected position of adjustment, cooperating abutment means between said retaining device and said frame forming rigid parts thereof and constructed and arranged to prevent their relative movement in either direction along the axis of said take-up screw or in either direction along an axis parallel with the plane of said frame guides and at right angles to the axis of said take-up screw while providing for removal of said retaining device, and removable means interconnecting said retaining device and said frame for holding them together in operative relation.

13. Take-up mechanism including a frame having spaced parallel guides lying in a common plane, a shaft bearing having spaced grooves adapted to receive said frame guides whereby said bearing may slide along said guides, a take-up screw connected to said bearing and extending betwen said guides, a retaining device extending across said guides adjacent one end of said frame having an opening through which said take-up screw extends, means cooperating with said take-up screw and retaining device to adust said bearing along said guides and hold it in any selected position of adjustment, cooperating abutment means between said retaining device and said frame forming rigid parts thereof and constructed and arranged to prevent their relative movement in either direction along the axis of said take-up screw while providing for removal of said retaining device, and removable means interconnecting said retaining device and said frame for holding them together in operative relation.

HARRY R. PATTERSON.

CERTIFICATE OF CORRECTION.

Patent No. 2,320,295. May 25, 1943.

HARRY R. PATTERSON.

It is hereby certified that error appears in the printed specification of the above numbered patent requiring correction as follows: Page 4, second column, line 16, claim 8, for "untll" read --unit--; page 5, second column, line 6, claim 13, for "adust" read --adjust--; and that the said Letters Patent should be read with this correction therein that the same may conform to the record of the case in the Patent Office.

Signed and sealed this 25th day of April, A. D. 1944.

Leslie Frazer

(Seal)  Acting Commissioner of Patents.